(12) United States Patent
Gaxiola et al.

(10) Patent No.: US 10,141,732 B2
(45) Date of Patent: Nov. 27, 2018

(54) APPARATUS FOR SWITCHING IN A DC VOLTAGE GRID (71) Applicant: SIEMENS AKTIENGESELLSCHAFT, Munich (DE)

(72) Inventors: Enrique Gaxiola, Aix en Provence (FR); Andre Schoen, Bayreuth (DE)

(73) Assignee: Siemens Aktiengesellschaft, Munich (DE)

( * ) Notice: Subject to any disclaimer, the term of this patent is extended or adjusted under 35 U.S.C. 154(b) by 759 days.

(21) Appl. No.: 14/407,704

(22) PCT Filed: May 15, 2013

(86) PCT No.: PCT/EP2013/060072
§ 371 (c)(1),
(2) Date: Dec. 12, 2014

(87) PCT Pub. No.: WO2013/186004
PCT Pub. Date: Dec. 19, 2013

(65) Prior Publication Data
US 2015/0171617 A1 Jun. 18, 2015

(30) Foreign Application Priority Data

Jun. 13, 2012 (DE) .................. 10 2012 209 903

(51) Int. Cl.
*H02H 3/087* (2006.01)
*H02H 7/26* (2006.01)
(Continued)

(52) U.S. Cl.
CPC .............. *H02H 3/087* (2013.01); *H02H 3/08* (2013.01); *H02H 7/268* (2013.01); *H02J 1/00* (2013.01); *H01H 33/596* (2013.01)

(58) Field of Classification Search
CPC ........ H02H 3/087; H02H 7/268; H02H 3/202; H01H 33/596; H02J 1/00
See application file for complete search history.

(56) References Cited

U.S. PATENT DOCUMENTS 4,305,107 A    12/1981  Murano et al.
4,442,469 A *   4/1984  Yanabu ............... H01H 33/596
                                                 361/2
(Continued)

FOREIGN PATENT DOCUMENTS

CN      102132370 A    7/2011
DE        1069758 B   11/1959
(Continued)

*Primary Examiner* — Ronald W Leja
*Assistant Examiner* — Christopher Clark
(74) *Attorney, Agent, or Firm* — Laurence Greenberg; Werner Stemer; Ralph Locher (57) ABSTRACT An apparatus for switching in a DC voltage mains has a switching device for interrupting the flow of current in at least one line of the DC voltage grid. The switching device is connected into the line of the DC voltage grid by way of a first and a second connection. An attenuation member absorbs energy from the applied terminal voltage. The attenuation member has a first and a second node that are electrically connected via an attenuation element, an electrical connection from the first node to the first connection via a first controlled or uncontrolled switching element, and an electrical connection from the first node to the second connection via a second controlled or uncontrolled switching element.

20 Claims, 5 Drawing Sheets (51) Int. Cl.
H02H 3/08 (2006.01)
H02J 1/00 (2006.01)
H01H 33/59 (2006.01)

(56) References Cited

U.S. PATENT DOCUMENTS

| | | | |
|---|---|---|---|
| 4,618,905 A | 10/1986 | Tokuyama et al. | |
| 4,805,062 A * | 2/1989 | Shirouzu | H01H 33/596 361/13 |
| 5,214,557 A * | 5/1993 | Hasegawa | H01H 33/596 361/11 |
| 5,452,170 A * | 9/1995 | Ohde | H01H 33/596 174/DIG. 17 |
| 5,737,162 A * | 4/1998 | Ito | H01H 33/596 361/13 |
| 8,837,093 B2 * | 9/2014 | Panousis | H01H 33/596 361/13 |
| 8,995,097 B2 * | 3/2015 | Skarby | H02H 3/087 361/2 |
| 9,178,348 B2 * | 11/2015 | Gaxiola | H01H 33/596 |
| 9,478,974 B2 * | 10/2016 | Gaxiola | H02H 3/087 |
| 2011/0175460 A1 | 7/2011 | Astroem et al. | |
| 2012/0153928 A1 * | 6/2012 | Shipley | H02H 3/06 323/311 |
| 2013/0050881 A1 | 2/2013 | Häfner et al. | |
| 2013/0070492 A1 * | 3/2013 | Skarby | H01H 33/596 363/51 |
| 2013/0256109 A1 * | 10/2013 | Marquardt | H01H 33/596 200/5 A |
| 2014/0117872 A1 * | 5/2014 | Finley | H01J 37/3405 315/287 |
| 2014/0233140 A1 * | 8/2014 | Gaxiola | H02H 3/087 361/67 |
| 2015/0022928 A1 * | 1/2015 | Mohaddes Khorassani | H02H 3/087 361/93.7 |
| 2016/0336734 A1 * | 11/2016 | Lee | H02H 3/202 |

FOREIGN PATENT DOCUMENTS

| | | | |
|---|---|---|---|
| DE | 2312238 A1 | 9/1973 | |
| DE | 3734989 A1 | 4/1988 | |
| DE | 4304863 A1 | 8/1993 | |
| DE | 102010052136 A1 | 5/2012 | |
| DE | 102011083693 | * 3/2013 | H02H 3/087 |
| EP | 2789068 B1 | 3/2016 | |
| JP | 2006032077 A | 2/2006 | |
| WO | 2011141052 A1 | 11/2011 | |
| WO | 2012045360 A1 | 4/2012 | |
| WO | 2013107556 A1 | 7/2013 | |

* cited by examiner

APPARATUS FOR SWITCHING IN A DC VOLTAGE GRID

BACKGROUND OF THE INVENTION

Field of the Invention

The invention relates to an apparatus for switching in a DC voltage grid and to a method for dividing a direct-current power grid.

Power electronic systems in the field of energy supply—with very high required voltages and powers—are becoming increasingly important. Particularly for future spatially extensive and multiterminal high-voltage direct-current (HVDC) grids, circuit arrangements are required which enable possible cases of disturbance to be controlled reliably and rapidly and also make possible extremely low energy losses during normal operation. These requirements arise particularly in the case of future DC grids with high voltages and long-distance transmission across countries.

Spatially extensive and multiterminal HVDC grids will be required in the future for example for extensive offshore wind farms and the use of large solar power plants in remote desert regions. In particular, short circuits in the HVDC grid must be able to be controlled and faulty/short-circuited sections of the grid must be able to be isolated.

Expedient mechanical switches for the extremely high DC voltages which can switch high fault currents under load are not available owing to fundamental physical problems. The technically achievable turn-off times and the switching over voltages of mechanical switches are also extremely disturbing. In accordance with the prior art, therefore, mechanical switches for these applications can be expediently realized only as disconnectors that switch without load (without current). The problem addressed by the present invention is to specify a simply constructed apparatus for switching in a DC grid. A further problem addressed by the invention consists in specifying an improved method for dividing a direct-current power grid.

BRIEF SUMMARY OF THE INVENTION

This problem is solved by an apparatus having the features as claimed. In respect of the method, the problem is solved by a method as claimed.

The apparatus according to the invention for switching in a DC voltage grid has a switching device for interrupting the flow of current in at least one first line of the DC voltage grid. In this case, the switching device can be inserted with a first and a second connection into the first line of the DC voltage grid.

Furthermore, the apparatus has a damping member for energy absorption of the terminal voltage applied. The damping member in turn has a first and a second node which are electrically connected via a damping element. Furthermore, there is an electrical connection from the first node to the first connection via a first controlled or uncontrolled switching element and an electrical connection from the first node to the second connection via a second controlled or uncontrolled switching element. Expediently, the damping member is connectable from the second node to a second line of the DC voltage grid and/or to a ground potential.

In the case of the method according to the invention for dividing a DC voltage grid, a switching device is provided and is inserted with a first and a second connection into a first line of the DC voltage grid. Furthermore, a damping element is provided and the damping element is connected to the first connection via a first controlled or uncontrolled switching element and is connected to the second connection via a second controlled or uncontrolled switching element. In a first step, according to the invention, a current pulse is generated by the switching device, with the result that a current reversal is temporarily caused in the switching device. Furthermore, in a second step, the switching device is disconnected during the current reversal, that is to say the flow of current in the first line is interrupted. Finally, in a third step, the electrical connection between the damping element and the first or second connection of the switching device which is located in the current direction is produced to de-excite a load-side line inductance.

What is advantageously achieved thereby is that a single damping element can be used for both of the possible current flow directions. For the division of the first line, the damping element is connected to the correct side of the switching device via the switching elements, such that a de-excitation of the line inductance is enabled after interruption of the actual flow of current. As a result, the use of two or even more damping elements, each for one current flow direction, is unnecessary.

The damping element expediently comprises one or more nonlinear resistances, in particular varistors.

In a first advantageous configuration of the invention, the first and/or second switching element comprises semiconductor switches, in particular thyristors. The use of semiconductor switches makes it possible to control the exact instant at which the freewheeling circuit is provided for the inductively driven current when the first line is isolated. The freewheeling circuit can also be interrupted again in a controlled manner.

In a second advantageous configuration, the first and/or second switching element comprises uncontrolled current-direction-dependent switching elements, in particular semiconductor diodes. In this case, a series circuit composed of diodes is expediently used in each case. The diodes are expediently switched to be conducting from the point of view of the first node, that is to say blocking from the point of view of the first line, here. What is achieved as a result is that an active connection of the damping element in the case of an isolation of the first line by the switching device becomes unnecessary. One of the diodes which is blocking under normal circumstances is switched to become conducting by the line inductance located upstream since said line inductance drives the current on and generates a corresponding voltage drop for a certain time. Thus, a freewheeling circuit is reliably provided for the current without the aid of a control circuit, which leads to an increased reliability and a simpler construction and operation of the switch.

In another advantageous configuration, the first and second switching elements comprise mechanical switches. Furthermore, the damping element comprises a further semiconductor switch between the first and second nodes. Advantageously, in this connection, it is possible to realize isolation of the damping element from the first line, which isolation can be checked visually, for example. Also in this case, as in the case of the first configuration, the exact instant at which the freewheeling circuit is provided for the inductively driven current when the first line is isolated can be controlled. Again, the freewheeling circuit can be interrupted again in a controlled manner.

According to another configuration and development of the invention, the first and second switching elements are parts of a mechanical or power-electronic changeover switch. In other words, the switching elements are not separately controllable switches but are realized as one changeover switch. According to another configuration of the invention, the changeover switch in this case comprises more than two switching positions. In this case, it is expedient if one of the outgoing electrical circuits is connected to ground or to a second line of the direct-current grid. All other outgoing electrical circuits are expediently connected to one or the other side of a plurality of switching devices. In another advantageous configuration, the changeover switch is configured as a plurality of parallel diodes. As a result of this, what is achieved is again that the changeover switch does not require any control but automatically opens the freewheeling circuit as soon as isolation has been performed by one of the closed switching devices.

Expediently, the switching device comprises two hybrid switches connected back-to-back in series, which in each case have a parallel circuit composed of an uncontrolled current-direction-dependent switch and of a controllable switch. The two hybrid switches connected back-to-back in series can in this case, as already described at the outset, be inserted with the first and second connection into the first line of the DC voltage grid. The uncontrolled current-direction-dependent switch is preferably a semiconductor diode, while the controllable switch is preferably a vacuum interrupter.

Furthermore, the switching device preferably comprises a current pulse generator which is set up to generate a current pulse in response to a control command, with the result that the current direction in one of the hybrid switches is temporarily reversible.

In this case, the current pulse generator expediently comprises at least one capacitive energy store and an inductance, which can be temporarily electrically connected to one another via a controllable switch, and a circuit path for charging the capacitive energy store from the voltage of the DC voltage grid and for overvoltage limiting, which circuit path contains at least said energy store and/or a series resistor and a blocking diode.

It is advantageous if additional elements for overvoltage limiting, in particular nonlinear resistors such as varistors, are connected in parallel with the current pulse generator or are integrated therein. In this connection, it is advantageous that in the described apparatuses no semiconductors with fault-critical non-surge-current-proof contact lines—for instance bonding wires in the case of IGBT transistors—are necessary. Since exclusively semiconductor diodes and thyristors are used, components with surge current-proof pressure contact can be used.

In particular, the arbitrary series connect ability of all the subsystems according to the invention enables a free choice of the rated voltage of the components used, independently of the predefined voltage of the DC voltage grid. One aspect involves in this regard economic reasons and the commercial availability of the components. However, a technically more important degree of freedom which results from this property is the optimization of the switching speed of the DC switches that can be realized.

Further expedient configurations and advantages of the invention are the subject of the following description of exemplary embodiments of the invention with reference to the figures of the drawing, wherein identical reference signs refer to identically acting components. In the figures:

DESCRIPTION OF THE INVENTION

Figure 1:
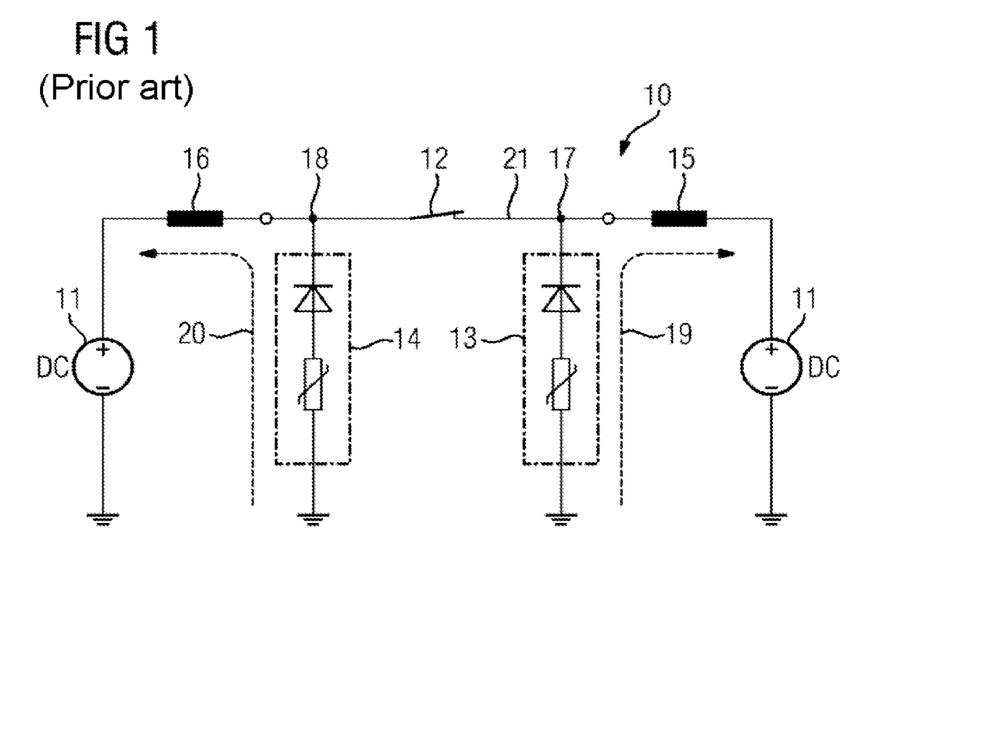
FIG. 1 shows a section from a spatially extended multiterminal DC voltage grid according to the prior art.

FIG. 1 schematically shows a section 10 from a spatially extended multiterminal DC voltage grid according to the prior art. Transformers 11 generate a high DC voltage on a line 21. The line 21 has a DC switch 12 in the shown section, on the one side of which DC switch is a first node 17 and on the other side of which is a node 18. The DC switch 12 is configured to allow a DC isolator to become temporarily current-free by means of a short current pulse, upon which it is possible to isolate the line 21.

After the line 21 has been isolated, the line inductances 15, 16 drive a flow of current further and a drop in energy must be dealt with. During the build-up according to FIG. 1, two isolated damping members 13, 14 are provided for this purpose. The first damping member 13 is connected at a first node 17 on a first side of the DC switch 12, while the second damping member 14 is connected at a second node 18 on a second side of the DC switch 12. Depending on the previous current flow direction, after the isolation the current flows according to the first arrow 19 or according to the second arrow 20 through the first damping member 13 or through the second damping member 14. Two separate damping members 13, 14 are therefore necessary for the two possible current directions. These are optionally spatially isolated.

Figure 2:
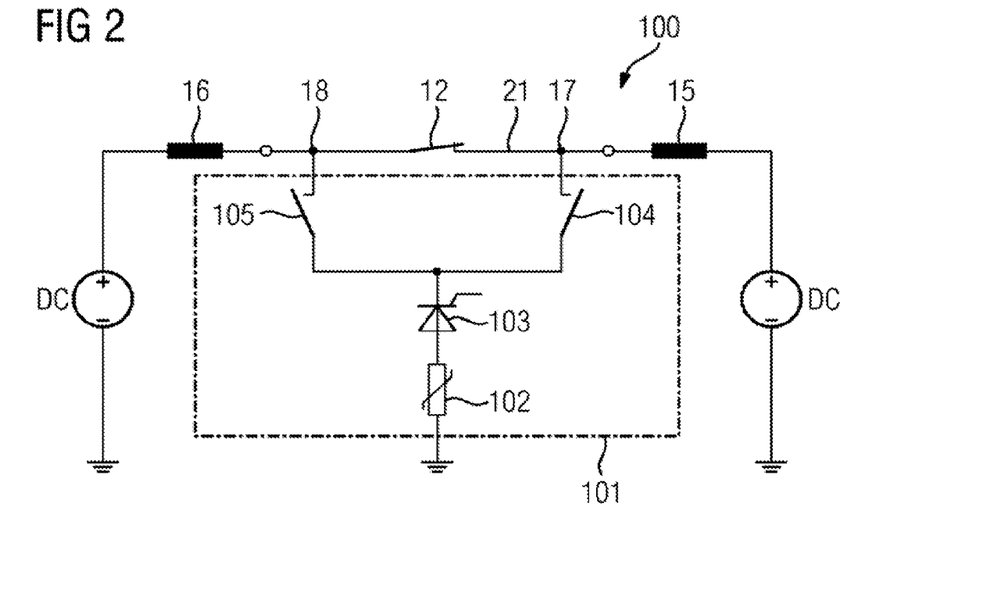
FIGS. 2, 3 and 6 show basic DC switch arrangements.

FIG. 2 shows a first example of a first DC switch arrangement 100 according to the invention, again in a spatially extended multiterminal DC voltage grid. Likewise as in FIG. 1, in this case a DC switch 12 is provided in the line 21. Instead of the separate damping members 13, 14, only one first damping member 101 is provided in the first DC switch arrangement 100, however. The first damping member 101 comprises a varistor 102 and a thyristor 103 connected in series therewith. Subsequently, the first damping member 101 branches to give a first and a second mechanical switch 104, 105. The first mechanical switch 104 is connected to the first node 17 remotely from the thyristor 103, while the second mechanical switch 105 is connected to the second node 18 remotely from the thyristor 103.

Figure 4:
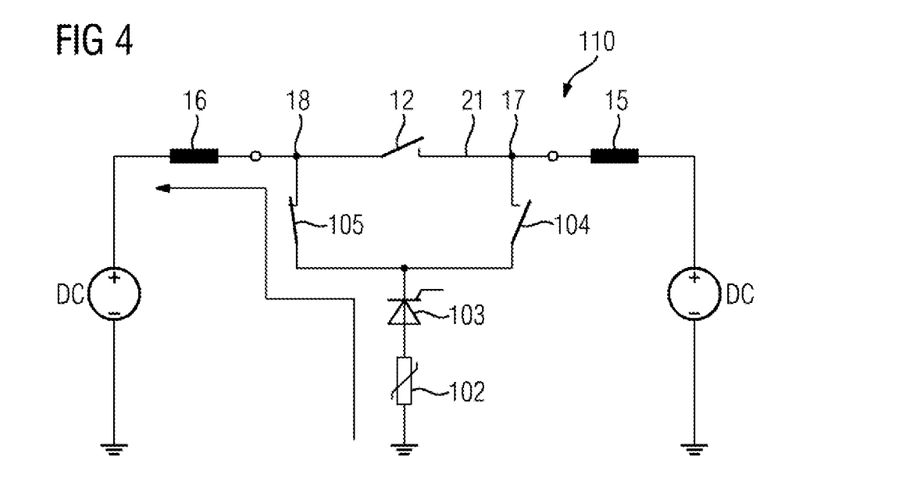
FIGS. 4 and 5 show operating states of the DC switch arrangements.
Figure 5:
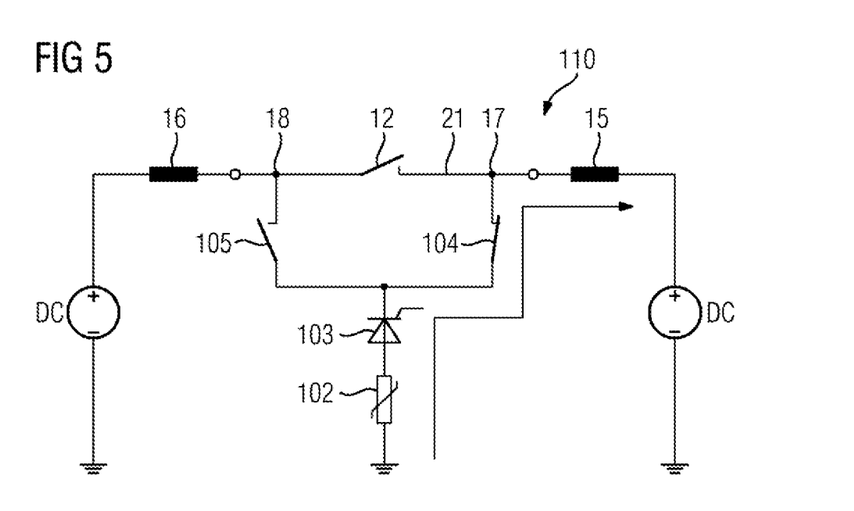

In the normal operating state of the DC voltage grid, the mechanical switches 104, 105 are open. However, if a de-excitation is to take place, one of the mechanical switches 104, 105 is then closed and then the thyristor 103 is triggered, with the result that a flow of current through the first damping member 101 is possible. The switching state for the de-excitation in the event of a flow of current from the first node 17 to the second node 18 is illustrated in FIG. 4. In this case, the second mechanical switch 105 is closed, while the first mechanical switch 104 is open. The thyristor 103 has been triggered in this case, and so the flow of current indicated by the arrow has been enabled. In turn, FIG. 5 shows the switching state for the de-excitation in the event of a flow of current from the second node 18 to the first node 17. In this case, the first mechanical switch 104 is closed, while the second mechanical switch 105 is open. The thyristor 103 has likewise been triggered in this case, and so the flow of current indicated by the arrow has been enabled.

Figure 3:
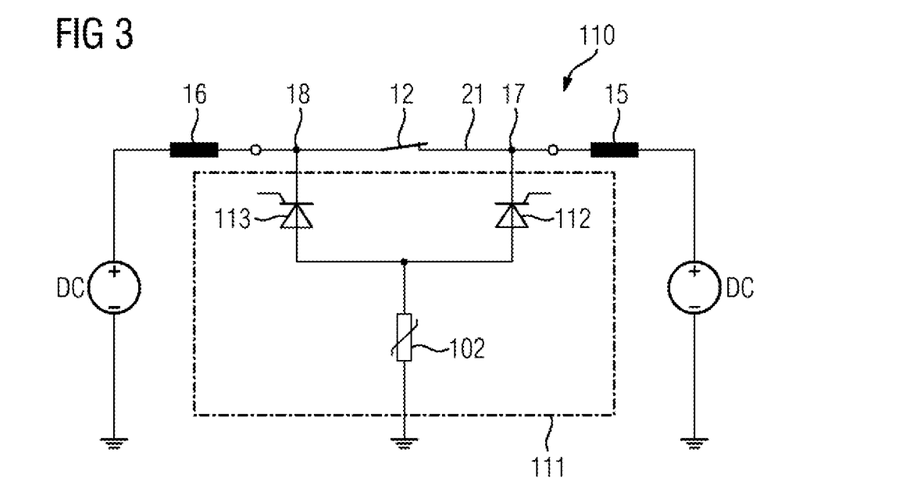

An alternative exemplary embodiment which does without mechanical switches 104, 105 is illustrated in FIG. 3. In this case, most of the elements of FIG. 2 are again repeated; however, instead of the first damping member 101, a second damping member 111 has been used. The second damping member 111 comprises a first and second thyristor 112, 113 in addition to the varistor 102, wherein the first thyristor 112 is connected to the first node 17 and the second thyristor 113 is connected to the second node 18.

In the case of the second damping member 111, in the normal operating state, the thyristors 112, 113 remain untriggered. However, if a de-excitation is to take place, then one of the two thyristors 112, 113, according to the direction of current which prevailed before the isolation, is triggered and thus again allows the current flow for the purpose of de-excitation.

Figure 6:
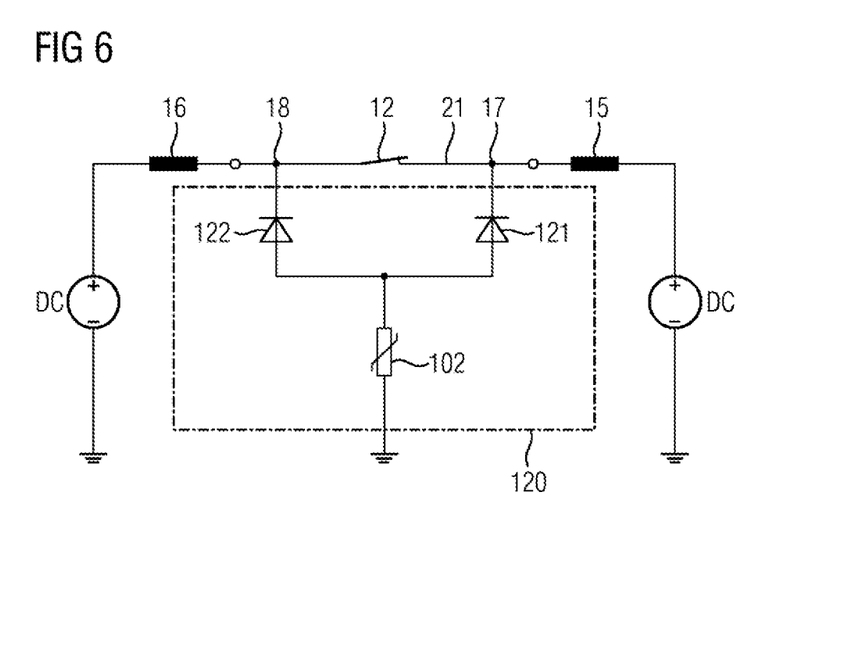

A third exemplary embodiment is outlined in FIG. 6. In this case, a third damping member 120 is used. The third damping member 120 comprises diodes 121, 122, which are connected so as to be blocking from the point of view of the line 21, instead of the thyristors 112, 113 of the second damping member 111. They thereby prevent a short-circuit across the third damping member at any time; however, they allow a flow of current from the direction of the varistor 102 in the event of a necessary de-excitation. Advantageously, no active circuit is necessary in the case of the third damping member 120. The voltage generated by the line inductances 15, 16 after isolation automatically takes care of a line across the diodes 121, 122.

Figure 7:
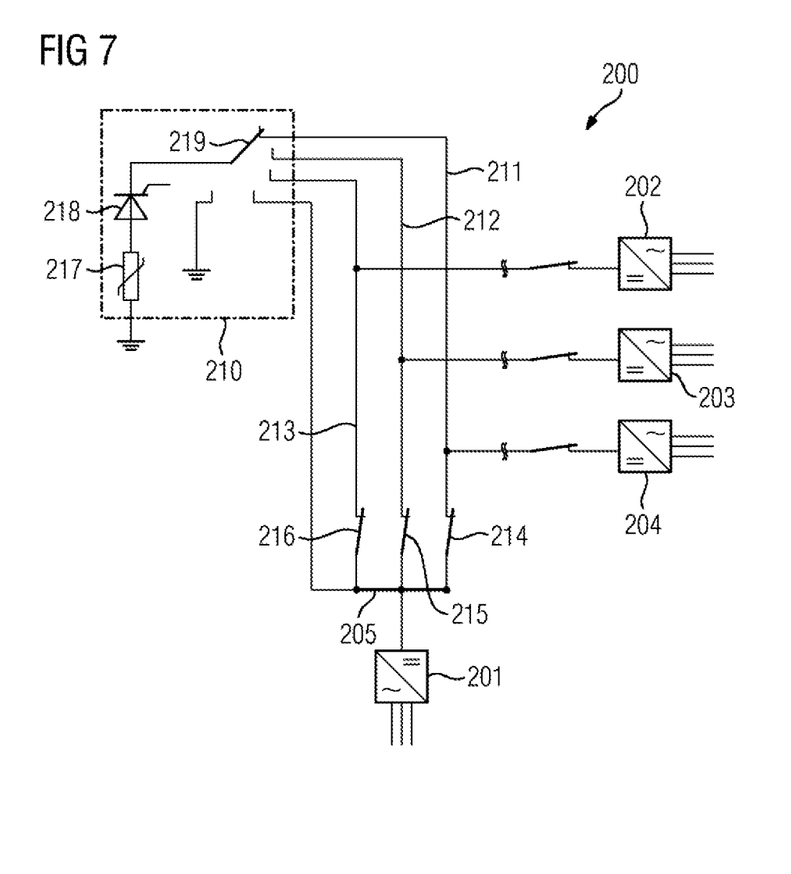
FIG. 7 shows a node of a multiterminal DC voltage grid.

FIG. 7 shows a fourth exemplary embodiment of the invention. FIG. 7 shows a node 200 of a DC grid. The node 200 comprises a first AC-to-DC transformer 201, the DC output of which leads to a busbar 205. Three outgoing circuits are connected to the busbar, which outgoing circuits lead via in each case a first DC switch 214 . . . 216 to in each case a second DC switch. AC-to-DC transformers 202 . . . 204 are furthermore connected to the second DC switches, the outputs of which transformers lead in each case to further AC grids—not shown in FIG. 7. In other words, from the point of view of the first transformer 201, three DC strings are connected in parallel.

A special feature of the node 200 is now that it has a switchable damping member 210. The switchable damping member 210 has a varistor 217 which is connected to ground and a thyristor 218 connected in series with said varistor. In turn, a changeover switch 219 is arranged in series therewith. The changeover switch 219 is again configured such that it can create a connection to one of the three parallel DC strings to the respective DC line 211, 212, 213. Furthermore, there is a tap for the busbar and a further tap directly to ground.

The switchable damping member 210 thus provides the damping element 217 for a de-excitation process of one of the DC switches 214, 215, 216 and must not be embodied multiple times. The damping element in the form of the varistor 217 is connected to the respective outgoing circuit or to the busbar 205 in order to allow the de-excitation. In this case, de-excitation is likewise again possible for both possible current directions by virtue of the possible connection to the busbar 205.

Figure 8:
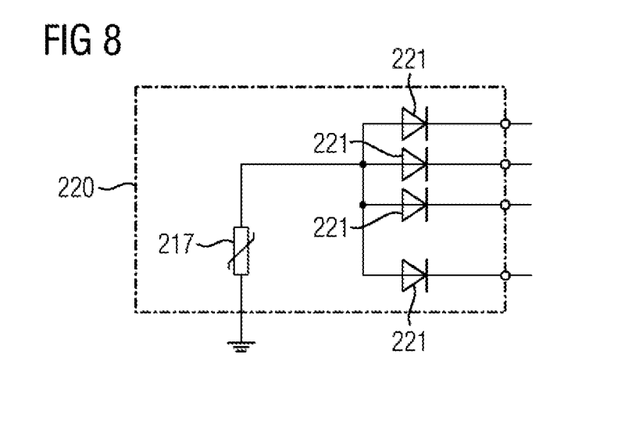
FIG. 8 shows an alternative changeover switch for the node.

An alternative possible embodiment of the switchable damping member 210 is illustrated as second switchable damping member 220 in FIG. 8. The second switchable damping member 220 is likewise connected at the node 200 like the switchable damping member 210 according to FIG. 7. It also has the varistor 217. However, in the case of the second switchable damping member 220, the thyristor 218 is omitted and the changeover switch 219 is replaced by a series of diodes 221 which are connected in parallel from the point of view of the varistor 217. The diodes 221 are expediently switched so as to be conducting from the point of view of the varistor 217 and to be blocking from the point of view of the DC grid. A diode connection to ground is omitted. Likewise as in the third exemplary embodiment according to FIG. 6, an active circuit is now no longer necessary for the de-excitation since the voltage built up by the line inductances automatically transfers the diodes 221 into the conducting state.

Figure 9:
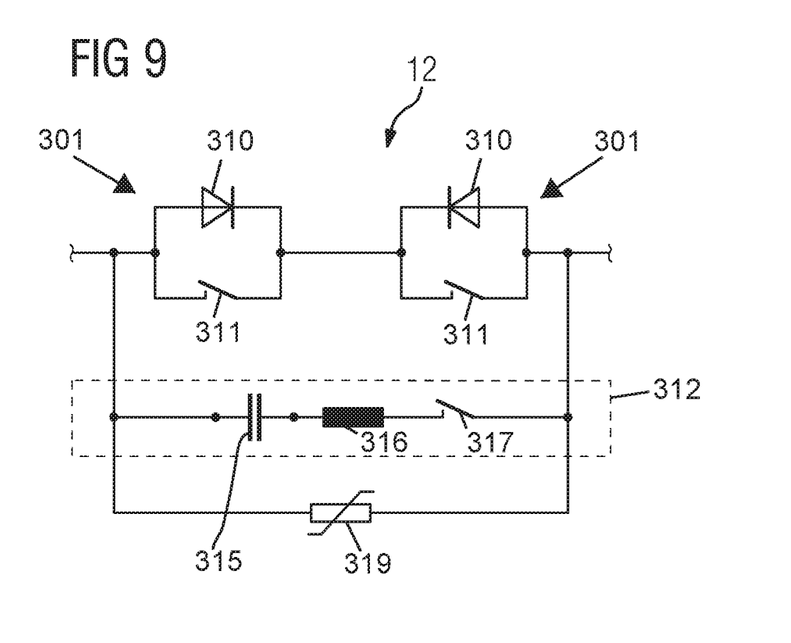
FIG. 9 shows an embodiment with a switching device having two hybrid switches connected back-to-back in series.

FIG. 9 shows an embodiment of the switching device 12 in which the switching device 12 has two hybrid switches 301, 301' connected back-to-back in series. Each of the hybrid switches 301, 301' has a parallel circuit including an uncontrolled current-direction-dependent switch, preferably, a semiconductor diode 310, 310' and a controllable switch, preferably, a vacuum interrupter 311, 311'. The switching device 12 preferably also includes a current pulse generator 312 configured to generate a current pulse in response to a control command, resulting in a current direction in one of the hybrid switches 301, 301' to be temporarily reversible. The current pulse generator 312 is configured to generate a current pulse in response to a control command. The current pulse generator 312 includes at least one capacitive energy storage device 315, an inductance 316, and a controllable switch 317 for temporarily electrically connecting the energy storage device 315 and the inductance 316 to one another. The switching device 12 preferably also includes a circuit path 318 for charging the capacitive energy storage device 315 from a voltage of the DC voltage grid and for overvoltage limiting. The circuit path 318 includes at least the energy storage device 315. The switching device 12 may also include one or more additional elements for overvoltage limiting. Each of the additional elements can be a nonlinear resistor, preferably, a varistor 319, connected in parallel with the current pulse generator or integrated in the current pulse generator 312.

The invention claimed is:

1. An apparatus for switching in a DC voltage grid, the apparatus comprising:
   a switching device for interrupting a flow of current in at least a first line of the DC voltage grid;
   said switching device having a first connection and a second connection for inserting said switching device into the first line of the DC voltage grid;
   a damping member for energy absorption of a terminal voltage, said damping member having:
   a first node, a second node, and a damping element electrically connecting said first and second nodes to one another, said damping element including a varistor;
   a first controlled or uncontrolled switching element directly connected to said first node and directly connected to said first connection; and
   a second controlled or uncontrolled switching element directly connected to said first node and directly connected to said second connection;
   said second node being connected to a second line of the DC voltage grid.

2. The apparatus according to claim 1, wherein each of said first and second switching elements comprises an uncontrolled current-direction-dependent switching element.

3. The apparatus according to claim 2, wherein said uncontrolled current-direction-dependent switching elements are semiconductor diodes.

4. The apparatus according to claim 1, wherein each of said first and second switching elements comprises a semiconductor switch.

5. The apparatus according to claim 4, wherein said semiconductor switches are thyristors.

6. The apparatus according to claim 1, wherein each of said first and second switching elements comprises a mechanical switch, and said damping member includes a further semiconductor switch between said first and second nodes.

7. The apparatus according to claim 1, wherein said damping element comprises one or more varistor elements.

8. The apparatus according to claim 1, wherein said first and second switching elements are parts of a mechanical or power-electronic changeover switch.

9. The apparatus according to claim 1, wherein said switching device has two hybrid switches connected back-to-back in series, each of said hybrid switches having a parallel circuit composed of an uncontrolled current-direction-dependent switch and of a controllable switch.

10. The apparatus according to claim 9, wherein said switching device further comprises a current pulse generator configured to generate a current pulse in response to a control command, resulting in a current direction in one of said hybrid switches to be temporarily reversible.

11. The apparatus according to claim 9, wherein said uncontrolled current-direction-dependent switch is a semiconductor diode.

12. The apparatus according to claim 11, wherein said controllable switch is a vacuum interrupter.

13. The apparatus according to claim 1, wherein said switching device further comprises a current pulse generator configured to generate a current pulse in response to a control command, said current pulse generator including at least one capacitive energy storage device, an inductance, and a controllable switch for temporarily electrically connecting said energy storage device and said inductance to one another, and a circuit path for charging said capacitive energy storage device from a voltage of the DC voltage grid and for overvoltage limiting, said circuit path containing at least said energy storage device and/or a series resistor and a blocking diode.

14. The apparatus according to claim 13, which comprises additional elements for overvoltage limiting connected in parallel with said current pulse generator or integrated in said current pulse generator.

15. The apparatus according to claim 14, wherein said elements for overvoltage limiting are nonlinear resistors.

16. The apparatus according to claim 15, wherein said nonlinear resistors are varistors.

17. A method for dividing a DC voltage grid, the method which comprises:
connecting a switching device with a first connection and a second connection into a first line of the DC voltage grid;
providing a damping member for energy absorption of a terminal voltage, the damping member having a first node, a second node connected to a second line of the DC voltage grid, and a damping element electrically connecting the first and second nodes to one another, the damping element including a varistor;
providing a first controlled or uncontrolled switching element directly connected to the first node and directly connected to the first connection and providing a second controlled or uncontrolled switching element directly connected to the first node and directly connected to the second connection;
generating a current pulse with the switching device, to cause a temporary current reversal, the switching device being disconnected during the current reversal; and
producing an electrical connection between the varistor of the damping member and the connection of the switching device which is located in the current direction to de-excite a load-side line inductance.

18. An apparatus for switching in a DC voltage grid, the apparatus comprising:
a switching device for interrupting a flow of current in at least a first line of the DC voltage grid;
said switching device having a first connection and a second connection for inserting said switching device into the first line of the DC voltage grid;
a damping member for energy absorption of a terminal voltage, said damping member having:
a first node, a second node, and a damping element electrically connecting said first and second nodes to one another, said damping element including a varistor;
a first thyrister connecting said first node to said first connection; and
a second thyrister connecting said first node to second connection;
said second node being connected to a second line of the DC voltage grid.

19. An apparatus for switching in a DC voltage grid, the apparatus comprising:
a switching device for interrupting a flow of current in at least a first line of the DC voltage grid;
said switching device having a first connection and a second connection for inserting said switching device into the first line of the DC voltage grid;
a damping member for energy absorption of a terminal voltage, said damping member having:
a first node, a second node, and a damping element electrically connecting said first and second nodes to one another, said damping element including a varistor;
a first controlled or uncontrolled switching element connecting said first node to said first connection; and
a second controlled or uncontrolled switching element connecting said first node to second connection;
said second node being connected to a second line of the DC voltage grid;
wherein each of said first and second switching elements comprises a mechanical switch and said damping member includes a further semiconductor switch between said first and second nodes.

20. An apparatus for switching in a DC voltage grid, the apparatus comprising:
a switching device for interrupting a flow of current in at least a first line of the DC voltage grid;
said switching device having a first connection and a second connection for inserting said switching device into the first line of the DC voltage grid;
a damping member for energy absorption of a terminal voltage, said damping member having:
a first node, a second node, and a damping element electrically connecting said first and second nodes to one another, said damping element including a varistor;
a first controlled or uncontrolled switching element connecting said first node to said first connection; and a second controlled or uncontrolled switching element connecting said first node to second connection;
said second node being connected to a second line of the DC voltage grid;
wherein said first and second switching elements are parts of a mechanical changeover switch or a power-electronic changeover switch.

\* \* \* \* \*